(No Model.)  2 Sheets—Sheet 1.

W. P. BLAKE.
FURNACE FOR ROASTING ORES.

No. 513,754. Patented Jan. 30, 1894.

Witnesses.
J. A. Shumway
Lillian D. Kelsey

William P. Blake,
Inventor
By Atty's
Earle Seymour (No Model.) 2 Sheets—Sheet 2.

W. P. BLAKE.
FURNACE FOR ROASTING ORES.

No. 513,754. Patented Jan. 30, 1894.

Witnesses.
J. H. Shumway
Lillian D. Kelsey

William P. Blake,
Inventor
By Attys.
Earle Seymour

THE NATIONAL LITHOGRAPHING COMPANY,
WASHINGTON, D. C.

UNITED STATES PATENT OFFICE.

WILLIAM P. BLAKE, OF NEW HAVEN, CONNECTICUT.

FURNACE FOR ROASTING ORES.

SPECIFICATION forming part of Letters Patent No. 513,754, dated January 30, 1894.

Application filed March 23, 1891. Serial No. 386,028. (No model.)

*To all whom it may concern:*

Be it known that I, WILLIAM P. BLAKE, of New Haven, in the county of New Haven and State of Connecticut, have invented a new Improvement in Furnaces for Roasting Ores and Like Purposes, (Case A;) and I do hereby declare the following, when taken in connection with accompanying drawings and the letters of reference marked thereon, to be a full, clear, and exact description of the same, and which said drawings constitute part of this specification, and represent, in—

Figure 1:
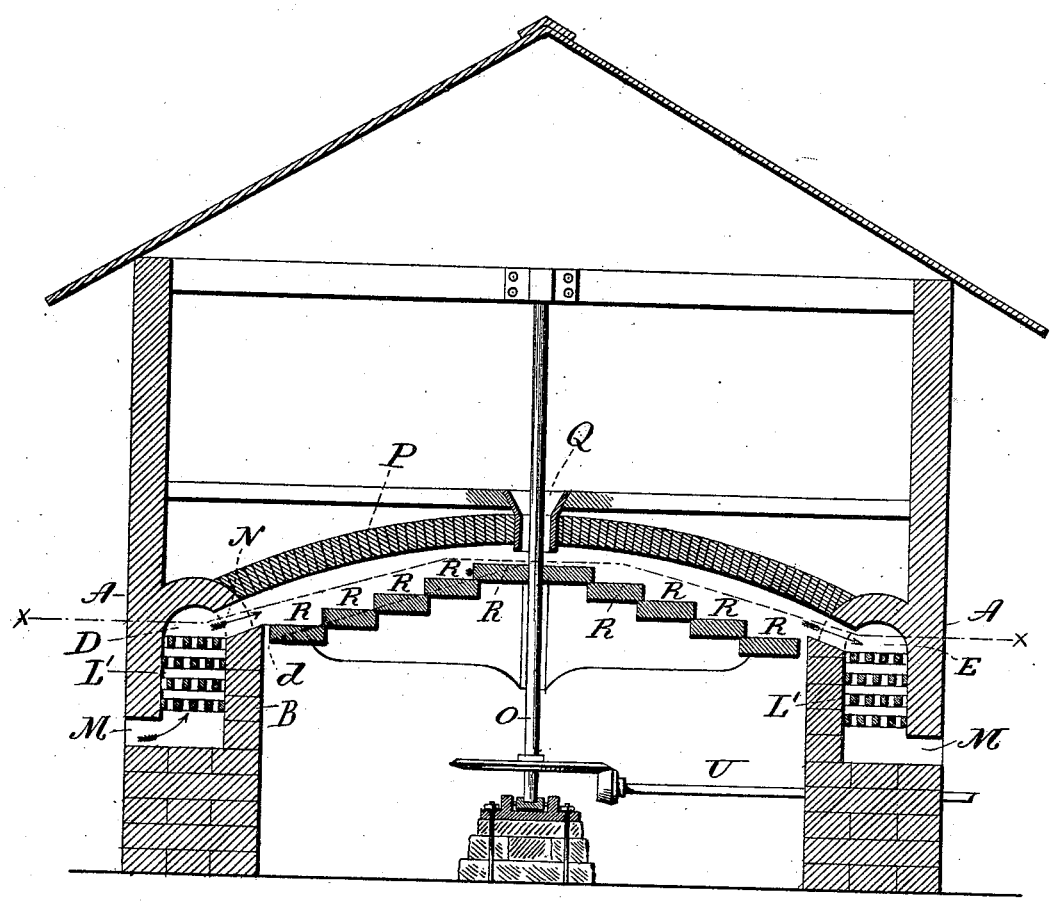
Figure 2:
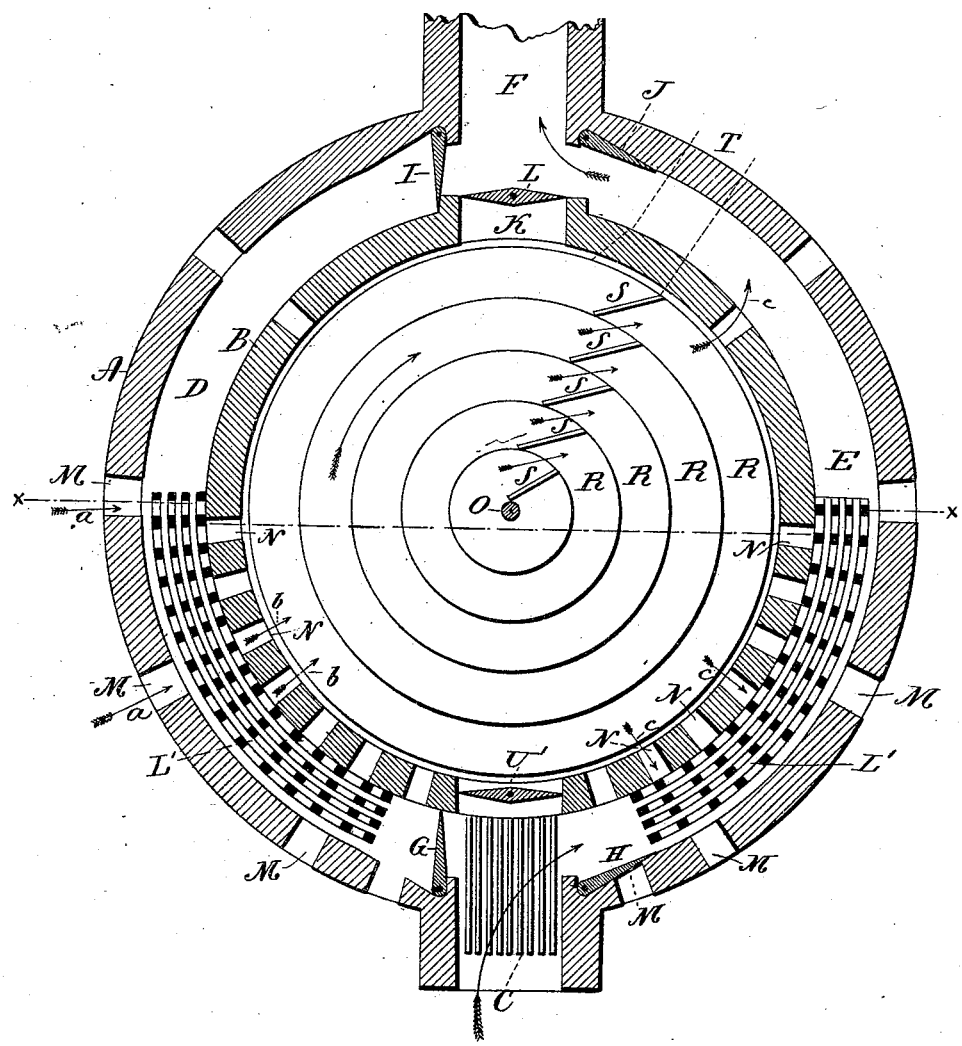

Figure 1, a vertical central section through the furnace on line $x$—$x$ of Fig. 2; Fig. 2, a horizontal section cutting on line $x$—$x$ of Fig. 1.

This invention relates to an improvement in furnaces for roasting, oxidizing, desulphurizing and chloridizing ores and for like purposes.

In the more general construction of furnaces for roasting ores, the products of combustion from the fuel, consisting of smoke and waste gases, are permitted to come more or less into direct contact with the ore to be treated. The ore is therefore exposed in a vitiated atmosphere, deprived of the larger part if not entirely of its free oxygen. The air in this condition is comparatively inert for oxidizing purposes, and although it may impart heat to the ore, it cannot produce the chemical effect of oxidizing or roasting. Under such conditions, roasting is a tedious and imperfect operation, effected generally by the comparatively small amount of free oxygen present, or by the access of a portion of cold air from the outside mingling with the spent gases of combustion.

The object of my invention is the construction of a furnace in which the products of combustion may be excluded from contact with the ore, while fresh, unvitiated air may be freely supplied in a heated state under the conditions most favorable to rapid and complete roasting or oxidation, and the invention consists essentially of a chamber and a hearth upon which the ore to be treated is spread, called the roasting-chamber, combined with regenerative or heat accumulating chambers, arranged so that by means of flues and dampers currents of fresh air may be caused to pass through the heated regenerative chambers alternately, and be delivered upon the charge of ore in the roasting-chamber, while the products of combustion of the fuel by which the regenerative chambers are alternately heated, are carried to the chimney E, passing over the ore or in contact therewith.

In the illustration, the furnace is represented as in a building constructed expressly for the purpose and of a circular shape; this structure consists of an outer wall A, and an inner concentric wall B; at one point in these walls a fire-box C, is arranged, where fire may be maintained, in the usual manner of fires for roasting purposes. Between the walls A B on one side, is a chamber D, leading from the fire-box C, and upon the opposite side is a like chamber E, leading from that side of the fire-box, the two chambers terminating at an escape flue F, preferably diametrically opposite the fire-box C. At the fire-box a damper G, is arranged, which is adapted to open or close the passage from the fire-box into the chamber D, and upon the opposite side is a like damper H, which is adapted to open or close the passage from the fire-box into the chamber E. As here represented, these dampers are in the form of swinging doors, but any suitable damper which will readily open and cut off the communication between the fire-box and the respective chambers, will serve the purpose. At the termination of the chamber D, at the flue, a similar damper I, is arranged, by which that chamber may be cut off from the flue, or opened to the flue, as occasion requires, and upon the opposite side of the flue is a like damper J, which may open or cut off communication between the chamber E, and the flue F, as occasion requires. At the flue there is an opening K, through the inside wall to the flue F, which is provided with a damper L, by which the said opening K, may be opened or closed as occasion requires.

The chambers D and E are constructed in the usual manner of regenerative furnaces of refractory materials L; this may be fire-brick, soap-stone, or other material capable of retaining heat, but laid open so as to leave interstices for the free passage of the flames or products of combustion. The filling of the chambers should commence as near as may be to the fire-box, and it extends through the chambers as far as practicable. Here represented as about one half the distance from the fire-box to the flue.

Transversely or diametrically through the outer wall A, openings M, are formed, into each of the chambers D and E, and through the inner wall numerous openings N, are formed leading into the central or roasting chamber, which is surrounded by chambers D E.

The roasting chamber as here represented, is provided, with a rotating hearth, which is arranged upon a vertical shaft O, or it may be otherwise suitably supported, and so that the hearth may be rotated within the chamber, the extreme diameter of the hearth being slightly less than that of the internal diameter of the chamber, and the edge of the hearth is on a plane with, or slightly below the openings N, from the chambers D E, and as seen in Fig. 1. The roasting-chamber is covered by a suitable arch P, over the hearth. At the center of the arch, or at any convenient point, is an opening Q, through which the ore or material to be roasted may be introduced to the hearth below.

The hearth illustrated, is represented as presenting substantially a flat top or working surface. Stationary deflectors S, are arranged above the hearth, their lower edge standing as near the hearth as may be, and inclined forward in the direction of revolution of the hearth, as shown, the arrow indicating the direction of revolution, and so that ore upon the hearth, as the hearth revolves in the direction indicated by the arrow, the material which has dropped upon the central portion of the hearth will be directed so as to fall in advance of the first deflector. Then as the hearth revolves, that material as the first revolution is completed, will strike the first deflector, and be turned outward from the surface upon which it has rested and be thrown upon a surface outside said first surface, but in advance of the second deflector. The material will remain on this second surface, until the second deflector is reached, where it will be again deflected upon the third outer surface, and so on, until finally the material will be turned by the last deflector into a chute, indicated by the broken lines T, in Fig. 2, where it will be delivered from the rotating hearth.

In operation, and before the material is introduced to the roasting chamber, fire is prepared in the fire-box, and one of the regenerative chambers opened (as here represented the chamber E), by turning the damper H away from the fire-box, at the same time closing the opening K, by the damper L, also opening the damper J, from the regenerative chamber E, to the flue, at the same time closing the dampers G and I, of the other regenerative chamber D, so that the direct draft from the fire-box is now through the chamber E; the flame and products of combustion pass through the refractory material L', in the chamber E, and thence to the flue. The flames or heat from the fire operate to heat to a high degree the refractory material L', arranged in the said chamber E, and this heating is continued until the said refractory material is properly heated; in thus heating the refractory material, the openings M, may be closed if desirable. So soon as the regenerative chamber is properly heated, the dampers J and H are closed, and the dampers G and I, upon the opposite side are opened, so that the flame and heat from the fire will then pass through the regenerative chamber to the flue on that side, and in like manner heat the refractory material in that chamber. While this second heating is going on, the apparatus is ready for operation, and so soon as the heating operation on one side has been thus accomplished, (suppose for illustration, that the chamber D, has been heated, while now the chamber containing refractory material L', is being heated,) the hearth is caused to rotate by the application of power thereto in any desirable manner, (here represented as from a shaft U, in gear connection with the shaft O, of the hearth) and the hearth rotating, the ore or material to be roasted is introduced at the center, as before described, and the passages M, being open, fresh air is free to flow inward through the regenerative chamber, as indicated by the arrows $a$, thence through the openings N into the chamber, as indicated by the arrows $b$, and so as to strike directly upon the material on the hearth. The draft for the fresh air so admitted is through the openings from the inside into the opposite chamber D, as indicated by arrows $c$, thence to the flue, so that a strong draft of fresh air is maintained through the open regenerative chamber over the hearth to the flue, and the material on the hearth is acted upon by the hot air so admitted to produce the operation of roasting, or whatever may be desired, and so soon as the temperature in one chamber shall have been reduced so as to be no longer practically effective, the fire is turned from the other chamber, which has been under the operation of heating from the fire, while the first has been giving off its previously acquired heat, and as before described, then the fresh air passes through the second chamber, and escapes through the flue on the opposite side, as described for the first chamber, and so continuing, first the refractory material of one chamber is heated directly from the fire, while the heat of the other chamber is being utilized, and then the operation is reversed, and so that a practically continuous delivery of the hot clear fresh air is passing through the roasting chamber.

The object of the regenerative or heat accumulating chambers is not in this invention to heat the air to promote the more complete combustion of the fuel, whereby greater heating effects are produced and with a saving of fuel, but it is to heat the incoming air in its passage to the roasting chamber, and without the air coming in contact with the fuel in the fire-box or gases in the regenerative chambers, so that the chemical oxidizing effect of the air will be increased, with the result that the ore will be more rapidly and completely oxidized than it could be by cold or by vitiated air. The hot air entering freely and quickly into combination with the sulphur or other combustible elements of the ore, raises and tends to maintain the temperature of the charge.

While I prefer to employ the revolving circular hearth, other known forms of hearth may be employed, as for illustration a stationary hearth, and upon which the material to be roasted may be deposited, and when the roasting operation is completed, the material may be removed from the stationary hearth in the usual manner. By the employment of the rotative hearth I am enabled to make the feed and delivery of the ore or material automatic.

In many cases it may be desirable to open communication through the chamber direct from the fire-box to the flue; to this end an opening is formed at the rear of the fire-box into the roasting chamber, and in this opening is a damper U', which may be turned so as to open a direct communication from the fire to the flue through the chamber over the hearth.

The shape of the heating chamber and flues, while preferably of a circular form, may be varied according to the circumstances or style or shape of the hearth.

The invention may be operated in a modified form, especially where a high temperature is requisite, by causing the combustible gases of the fuel to enter the roasting chamber on one side while the heated air in excess is admitted on the other side. The unconsumed portion of the gases would thus be fully burned within the roasting chamber, thereby giving off more heat directly upon the ore while the excess of free oxygen in the heated air will effect the oxidation of the ore.

I do not claim broadly as my invention regenerative or heat accumulating chambers nor rotary hearths, but What I do claim is—

1. An ore roasting furnace having a fire-box, an escape flue, a roasting chamber having communication with the said flue, regenerating chambers having communication with the fire-box and the roasting chambers, and cold air inlets leading into the regenerating chambers, the said parts or features being constructed and arranged so that the cold air entering the cold air inlet and thence passing through the regenerating chambers into the roasting-chamber will act upon the ore therein virtually without being commingled with the draft of the fire-box and the products of combustion carried thereby, the heating and oxidizing drafts being virtually kept apart, substantially as described, and whereby the air supplied to the ore for chemical action thereupon is not diluted with the vitiated or spent air of the heating draft.

2. An ore-roasting furnace having a fire-box, an escape flue, a roasting chamber connected with the said box and flue, regenerating chambers, each connected at one end with the fire-box and at the other end with the escape-flue, inlet openings through the inner walls of the regenerating chambers into the ore-roasting chamber and inlet openings through the outer walls of the regenerating chambers for the inlet of cold air, a rotary hearth located in the roasting chamber, and dampers for reversing the draft of the fire-box alternately through the said regenerating chambers to which it is normally confined, and for alternately sending a draft of fresh air through the regenerating chambers and into the roasting-chamber, substantially as described, and whereby the oxidizing draft heated in the regenerating chambers is not diluted with the vitiated or spent air of the heating draft.

In testimony whereof I have signed this specification in the presence of two subscribing witnesses.

WM. P. BLAKE.

Witnesses:
FRED C. EARLE,
LILLIAN D. KELSEY.